3,398,054
MICROBIOLOGICAL TRANSFORMATIONS OF STEROLS
Claude Vezina, Oka, Quebec, and Kartar Singh, Beaconsfield, Quebec, Canada, assignors to American Home Products Corporation, New York, N.Y., a corporation of Delaware
No Drawing. Filed Nov. 9, 1965, Ser. No. 509,258
2 Claims. (Cl. 195—51)

ABSTRACT OF THE DISCLOSURE

Estrone is prepared by microbiological transformation from 19-hydroxycholesterol-3-acetate, 19-hydroxysitosterol-3-acetate, 19-hydroxy-4-sitosten-3-one and $3\beta,19$-dihydroxycholest-5-ene by incubation with the microorganism in the presence of cholest-4-en-3-one as inducer steroid. Similarly 6,19-oxidoandrost-4-ene-3,17-dione is prepared from 6,19-oxidocholest-4-en-3-one and $3\beta$-acetoxy-$5\alpha$-bromo-$6\beta$,19-oxidocholestane. Microorganisms utilizable are certain strains of *Corynebacterium simplex*, *Bacterium cyclooxydans*, *Bacillus sphaericus* and *Arthrobacter* species.

---

The present invention relates to microbiological transformations of sterols, and particularly to a process for preparing 19-nor-steroids or estrone. The latter compound is one of the most powerful naturally occurring estrogens and is useful in the treatment of disorders associated with estrogen deficiencies and in hormonal therapy in general. 19-nor-steroids have a wide variety of uses such as, for example, being useful as anti-fertility agents and as intermediates in the syntheses of estrogens.

More specifically, this invention relates to a microbiological method for converting sterols to the desired end products by incubating them with certain microorganisms, and isolating the desired transformation product by solvent extraction and evaporation of the solvent. Similar procedures have been described in the literature but it is a novel feature and a singular advantage of the process of this invention that the above microbiological transformations may be carried out with microorganisms which are easily available, which may be grown on simple inexpensive media, and which effect the desired transformations in good yields, giving the desired final products in a high state of purity.

Thus, we have found that *Corynebacterium simplex* ATCC 6,946, *Bacterium cyclooxydans* ATCC 12,673, *Bacillus sphaericus* ATCC 10,208, and *Arthrobacter* sp. ATCC 19,140 and ATCC 19,141 may be grown on a mineral salt medium containing cholesterol as the only source of carbon. Growths of the above microorganisms on the above medium, when incorporated with an inducer-steroid such as, for example, cholest-4-en-3-one, and then incubated with a 19-hydroxylated sterol such as, for example, 19-hydroxycholesterol-3-acetate, 19-hydroxysitosterol-3-acetate, 19-hydroxy-4-sitosten-3-one, or $3\beta$,19-dihydroxycholest-5-ene, will yield estrone as the main product of microbiological transformation.

Similarly, when incubating the same microorganisms as mentioned above under identical conditions with 6,19-oxidocholest-4-en-3-one or with $3\beta$-acetoxy-$5\alpha$-bromo-$6\beta$,19-oxidocholestane, 6,19-oxidoandrost-4-ene-3,17-dione is obtained. The latter product is a valuable intermediate in the preparation of estrogens or of 19-nor-steroids. It may easily be converted to the corresponding 19-hydroxy derivative by the procedure of Ueberwasser et al. published in Helv. Chim. Acta, vol. 46, p. 344 (1963) from which estrone may be obtained by microbiological conversion as described by Dodson and Muir in J. Am. Chem. Soc., vol. 83, p. 4627 (1961). Further oxidation of the 19-hydroxylated intermediates to the corresponding 19-carboxylic acids and elimination of the latter group in the manner described by Ueberwasser cited above yields 19-nor-steroids.

The following examples will illustrate this invention.

EXAMPLE 1

*Bacillus sphaericus* ATCC 10,208 is maintained on a mineral salt medium containing cholesterol as the only carbon source. Growth from agar-slants or a liquid medium is used to inoculate 50 ml. of a medium consisting of mineral salts only or any other suitable medium such as nutrient broth in a 250 ml. Erlenmeyer. An inducer-steroid such as cholest-4-en-3-one (50 to 500 mg./l.) is added and the flask is incubated on a rotary shaker for 24 to 96 hours at 24 to 28°. Five to ten milliliters of the shake flask growth of the organism is transferred to 50 ml. of nutrient broth in a 250 ml. Erlenmeyer. Fifteen milligrams of 19-hydroxycholesterol-3-acetate is added and the flask is incubated on a rotary shaker at 24° to 30° C. After 24 to 96 hour incubation, the broth is extracted with a water immiscible solvent such as methylene dichloride. Evaporation of the solvent extract yields a residue containing estrone as the main product of transformation.

In the same manner as described above but using $3\beta$,19-dihydroxycholest-5-ene, 19-hydroxysitosterol-3-acetate, or 19-hydroxy-4-sitosten-3-one as the substrate in the place of 19-hydroxycholesterol-3-acetate, estrone is also obtained.

In the same manner as described above but using *Corynebacterium simplex* ATCC 6,946, *Bacterium cyclooxydans* ATCC 12,673 *Arthrobacter* sp. ATCC 19,140, or ATCC 19,141, estrone is also obtained as the main product of transformation.

EXAMPLE 2

By using the general procedure described above, incubating *Bacillus sphaericus* ATCC 10,208 first with an inducer-steroid such as described above and then with 6,19-oxidocholest-4-en-3-one or with $3\beta$-acetoxy-$5\alpha$-bromo-$6\beta$,19-oxidocholestane, the compound 6,19-oxidoandrost-4-ene-3,17-dione is obtained.

In the same manner as described above, but using *Corynebacterium simplex* ATCC 6,946, *Bacterium cyclooxydans* ATCC 12,673, *Arthrobacter* sp. ATCC 19,140, or ATCC 19,141, 6,19-oxidoandrost-4-ene-3,17-dione is also obtained.

We claim:
1. The process of preparing estrone which comprises incubating, in the presence of a nutrient medium, a microorganism selected from the group which consists of *Corynebacterium simplex* ATCC 6,946, *Bacterium cyclooxydans* ATCC 12,673, *Bacillus sphaericus* ATCC 10,208 and *Arthrobacter* sp. ATCC 19,140 and ATCC 19,141, said incubation being carried out in the presence of cholest-4-en-3-one as inducer-steroid and, as substrate, a 19-hydroxylated sterol selected from the group which consists of 19-hydroxycholesterol-3-acetate, 19-hydroxysitosterol-3-acetate, 19-hydroxy-4-sitosten-3-one and $3\beta$, 19-dihydroxycholest-5-ene; and recovering esterone from the broth.

2. The process of preparing 6,19-oxidoandrost-4-ene-3,17-dione which comprises incubating, in the presence of a nutrient medium, a microorganism selected from the group which consists of *Corynebacterium simplex* ATCC 6,946, *Bacterium cyclooxydans* ATCC 12,673, *Bacillus sphaericus* ATCC 10,208 and *Arthrobacter* sp. ATCC 19,140 and ATCC 19,141 in the presence of cholest-4-en-3-one as inducer-steroid and, as substrate, a compound selected from the group which consists of 6,19-oxidocholest-4-en-3-one and 3β-acetoxy-5α-bromo-6β,19-oxidocholestane; and recovering 6,19-oxidoandrost-4-ene-3,17-dione from the broth.

No references cited.

ALVIN E. TANENHOLTZ, *Primary Examiner.*